(12) United States Patent
Greenwood et al.

(10) Patent No.: US 11,553,153 B2
(45) Date of Patent: Jan. 10, 2023

(54) DISPLAY SYSTEM AND METHOD

(71) Applicant: Jaguar Land Rover Limited, Coventry (GB)

(72) Inventors: Jeremy Greenwood, Coventry (GB); Giovanni Strano, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/448,515

(22) Filed: Jun. 21, 2019

(65) Prior Publication Data

US 2019/0313049 A1 Oct. 10, 2019

Related U.S. Application Data

(63) Continuation of application No. 15/504,821, filed as application No. PCT/EP2015/068970 on Aug. 18, (Continued)

(30) Foreign Application Priority Data

Aug. 18, 2014 (GB) ...................................... 1414632

(51) Int. Cl.
*H04N 5/445* (2011.01)
*H04N 7/18* (2006.01)
(Continued)

(52) U.S. Cl.
CPC ........... *H04N 5/44504* (2013.01); *B60R 1/00* (2013.01); *H04N 5/23238* (2013.01); (Continued)

(58) Field of Classification Search
None
See application file for complete search history.

(56) References Cited

U.S. PATENT DOCUMENTS 9,633,566 B2  4/2017 Skvarce et al.
2003/0108222 A1* 6/2003 Sato .......................... G06T 3/40
382/104
(Continued)

FOREIGN PATENT DOCUMENTS

CN   1568618 A   1/2005
EP   1892150 A2  2/2008
(Continued)

OTHER PUBLICATIONS

Third Office Action with English language translation, CN Patent Application No. 201580044317.8, dated Aug. 22, 2019, 21 pp.
(Continued)

*Primary Examiner* — Heather R Jones
(74) *Attorney, Agent, or Firm* — McCoy Russell LLP

(57) ABSTRACT

The present disclosure relates to a display system (1) for generating a composite view of a region behind a vehicle (V) towing a trailer (T). A first camera (C1) is provided for outputting first image data corresponding to a first image (IMG1), the first camera (C1) being configured to be mounted in a rear-facing orientation to the vehicle (V). A second camera (C2) is provided for outputting second image data corresponding to a second image (IMG2), the second camera (C2) being configured to be mounted in a rear-facing orientation to the trailer (T). An image processor (5) receives the first image data and said second image data. The image processor (5) is configured to combine said first image data and said second image data to generate composite image data corresponding to a composite image (IMG3). The present disclosure also relates to a corresponding method of generating a composite image (IMG3), and to a rig made up of a vehicle (V) and a trailer (T).

11 Claims, 9 Drawing Sheets

Related U.S. Application Data 2015, now Pat. No. 10,701,299, which is a continuation-in-part of application No. PCT/EP2015/068080, filed on Aug. 5, 2015.

(51) Int. Cl.
*B60R 1/00* (2022.01)
*H04N 5/232* (2006.01)

(52) U.S. Cl.
CPC ....... *H04N 5/232939* (2018.08); *H04N 7/181* (2013.01); *B60R 2300/105* (2013.01); *B60R 2300/303* (2013.01); *B60R 2300/406* (2013.01); *B60R 2300/806* (2013.01); *B60R 2300/8066* (2013.01)

(56) References Cited

U.S. PATENT DOCUMENTS

| | | | | |
|---|---|---|---|---|
| 2009/0140881 | A1* | 6/2009 | Sakai | G08G 1/164 340/901 |
| 2009/0231431 | A1* | 9/2009 | Grigsby | G06K 9/00791 348/149 |
| 2013/0107045 | A1 | 5/2013 | Soderlind et al. | |
| 2014/0085472 | A1* | 3/2014 | Lu | B60R 1/002 348/148 |
| 2014/0267688 | A1* | 9/2014 | Aich | B60W 50/0097 348/113 |
| 2014/0340516 | A1* | 11/2014 | Vojtisek | B60R 1/00 348/148 |
| 2017/0282813 | A1* | 10/2017 | Hashimoto | G08G 1/166 |
| 2017/0341583 | A1* | 11/2017 | Zhang | H04N 7/181 |

FOREIGN PATENT DOCUMENTS

| | | |
|---|---|---|
| EP | 2181898 A1 | 5/2010 |
| GB | 2515800 A | 1/2015 |
| JP | 2006-256544 A | 9/2006 |
| WO | WO 96/38319 A1 | 12/1996 |

OTHER PUBLICATIONS

Combined Search and Examination Report, GB Application No. 1414632.8, dated Feb. 6, 2015, 7 pages.
Search and Examination Report, GB Application No. 1414632.8, dated Sep. 11, 2015, 5 pages.
Combined Search and Examination Report, GB Application No. 1514673.1, dated Jan. 26, 2016, 6 pages.
Notification of Transmittal of the International Search Report and the Written Opinion of the International Searching Authority, or the Declaration, PCT/EP2015/068970, dated Nov. 17, 2015.
Communication pursuant to Article 94(3) EPC, EP Application No. 15754161.6, dated Feb. 18, 2018, 7 pp.
European Patent Office, Office Action Issued in Application No. 20168870.2, dated Jun. 24, 2021, Netherlands, 9 pages.

* cited by examiner

DISPLAY SYSTEM AND METHOD

RELATED APPLICATIONS

This application is a continuation of U.S. patent application Ser. No. 15/504,821, filed Feb. 17, 2017, which itself is a 35 U.S.C. § 371 national stage application of PCT Application No. PCT/EP2015/068970, filed on Aug. 18, 2015, which is a Continuation-In-Part of PCT Application No. PCT/EP2015/068080, filed on Aug. 5, 2015, which claims priority from Great Britain Patent Application No. 1414632.8 filed on Aug. 18, 2014, the contents of which are incorporated herein by reference in their entireties. The above-referenced PCT International Application was published in the English language as International Publication No. WO 2016/026870 A1 on Feb. 25, 2016.

TECHNICAL FIELD

The present disclosure relates to a display system for a vehicle towing a trailer, to a method of generating a composite image, and to a rig comprising a vehicle and a trailer.

BACKGROUND

It is common practice to tow a trailer behind a vehicle. A particular problem encountered while towing is the reduced visibility behind the vehicle. In particular, the trailer presents an obstacle which partially secures the driver's field of view behind the vehicle. Large and small trailers typically reduce visibility and create a blind spot behind the vehicle. The resulting lack of visibility can, for example, compromise the following manoeuvres: lane changes, overtaking, parking, joining a motorway (highway) and pulling out of junctions.

In order to mitigate the aforementioned problems, it is common practice to fit a so-called towing mirror to the side mirrors of the vehicle. The towing mirrors extend laterally outwardly to provide improved visibility along the side of the trailer. However, towing mirrors have several disadvantages, notably they increase the vehicle width and may reduce manoeuvrability in confined spaces. Moreover, towing mirrors are not well suited to providing a view of other vehicles positioned directly behind the trailer. Towing mirrors can also suffer from vibration and hence blurring of the image.

It is known to provide a rear-facing camera on a vehicle to enable a rear-view image to be displayed in the vehicle cabin, for example on an electronic display. However, when a trailer is being towed behind the vehicle, the image generated by the rear-facing camera will be at least partially obscured. As a consequence the image may include blind spots, for example in lateral regions alongside the trailer.

It is against this backdrop that the present invention has been conceived. At least in certain embodiments, the present invention seeks to overcome or ameliorate at least some of the aforementioned problems associated with prior art devices.

SUMMARY OF THE INVENTION

Aspects of the present invention relate to display system for a vehicle towing a trailer, to a method of generating a composite image, to a rig comprising a vehicle and a trailer.

According to a further aspect of the present invention there is provided a display system for a vehicle, the display system comprising:

a first camera configured to be mounted in a rear-facing orientation to the vehicle and to output first image data;

a second camera configured to be mounted in a rear-facing orientation to a trailer towed by the vehicle and to output second image data; and processor means for receiving said first image data and said second image data and for generating a composite image therefrom.

According to another aspect of the invention for which protection is sought there is provided a processor or control module for a vehicle, the processor or control module being configured and/or arranged to receive first image data from a first camera disposed in a rear-facing orientation relative to the vehicle and second image data from a second camera disposed in a rear-facing orientation relative to a trailer towed by the vehicle, and to generate a composite image from said first and second image data.

The processor or control module may be configured to output the composite image to a display system, such as a screen or digital display of the vehicle.

The display system may comprise a rear-view display system. The resulting composite image may be a rear-facing composite image which, at least in certain embodiments, can facilitate towing the trailer. In use, the first camera may be mounted to the vehicle and at least a portion of the first image may comprise a view of the front of the trailer. The second camera can be mounted to the rear of the trailer such that the second image is unobstructed. However, the second image does not provide the driver with an indication of the relative position and/or orientation of the trailer. As such, the driver of the vehicle may find it difficult to judge the relative position of obstructions and/or other vehicles to the trailer using the second image. By combining the first image data and the second image data, the view of the front of the trailer from the first image can be composited with the unobstructed second view. The first image can, for example, be displayed as a transparent or semi-transparent layer which overlays the second image (for example to provide a phantom or ghost image of the trailer). The composite image data can be output to a display screen to display the composite image.

The image processor can be configured to combine said first image data and said second image data such that at least a portion of one of said first image and said second image is overlaid onto the other of said first image and said second image. At least said portion of one of said first image and said second image can be overlaid as a transparent or semi-transparent image onto the other of said first image and said second image. In one implementation, the image processor can be configured to overlay at least a portion of said first image onto said second image to form the composite image data.

The image processor can be configured to select the portion of said first image or of said second image to be overlaid in dependence on an image mask. The image mask can be predefined or can be generated in dependence on the first image data. The first image data can be analysed to identify the trailer in the first image. The image mask can correspond to the trailer identified in the first image. The analysis of the first image can, for example, comprise performing edge detection or feature identification.

The image processor can be configured to combine said first image data and said second image data such that a portion of said first image or of said second image is substituted with at least a portion of the other of said first image and said second image.

The image processor can be configured to analyse said first image data and said second image data to identify one or more features common to both said first image and said second image. The image processor can be configured to match (align) said first image and said second image in dependence on the identified one or more features. The image processor can be configured to perform one or more of the following transforms to said first image and/or said second image: image rotation, scaling, cropping, magnification, skew correction and translation. These transforms could, for example, compensate for different viewing angles and/or imaging properties of the first and second cameras.

The image processor can be configured to generate said composite image in dependence on positional data defining the relative position of the first and second cameras. The positional data can comprise longitudinal positional data and/or vertical positional data and/or lateral positional data. A longitudinal offset between the first and second cameras can be used to facilitate registration of the first and second images. Alternatively, or in addition, the image processor can compensate for a lateral offset and/or a vertical offset between said first and second cameras.

The first camera can comprise a first wireless transmitter for transmitting the first image data to the image processor and/or the second camera can comprise a second wireless transmitter for transmitting the second image data to the image processor. Alternatively, a wired connection can be established between the image processor and the first camera and/or the second camera.

The image processor can be configured to augment the composite image with one or more of the following:
 a graphical representation of the trailer being towed by the vehicle;
 a graphical representation of a projected path for the trailer during a reversing operation;
 a vehicle control instruction(s) to guide the trailer during a reversing operation; and
 proximity information for the trailer.

The image processor can be a digital image processor. Alternatively, the image processor can be an analogue image processor configured to generate the composite image data.

The image processor can be configured to output the composite image data for display on a display screen. The display screen could, for example, be disposed in a centre console, an instrument cluster, or a rear-view mirror of the vehicle. Alternatively, the image processor can be configured to output the composite image data wirelessly, for example to be displayed on a network device, such as a cellular telephone or a so-called "smart-phone", a personal computer or a tablet computer.

According to a further aspect of the present invention there is provided a rig comprising a vehicle and a trailer, wherein the rig comprises a display system as described herein. The first camera can be mounted to the vehicle and the second camera can be mounted to the trailer.

According to a further aspect of the present invention there is provided a display system for providing a view of a region behind a vehicle, the display system comprising:
 a camera for mounting in a rear-facing orientation to a trailer, the camera being operable to output image data corresponding to an image;
 an image processor for receiving said image data;
 wherein the image processor is configured to overlay a graphical representation of the trailer onto the image data to form an augmented image for display.

According to a further aspect of the present invention there is provided a method of generating a composite image of a region behind a vehicle towing a trailer, the method comprising:
 using a first camera disposed on the vehicle to generate a first image;
 using a second camera disposed on the trailer to generate a second image;
 using an image processor to combine said first and second images to form a composite image.

The method can comprise overlaying at least a portion of one of said first image and said second image onto the other of said first image and said second image. The image to be overlaid onto the other image can be modified to be rendered in a transparent or semi-transparent form. At least said portion of one of said first image and said second image can be overlaid as a semi-transparent image onto the other of said first image and said second image. An image mask can be used to select the portion of said first image or of said second image to be overlaid. The image mask can be generated in dependence on the first image data.

The process of combining said first and second images can comprise substituting a portion of said first image or of said second image with at least a portion of the other of said first image and said second image.

The method can comprise identifying one or more features common to both said first image and said second image. The method can comprise matching said first image and said second image in dependence on the identified one or more features. The method can comprise performing image registration to match (align) the first and second images with each other. The image registration can be performed substantially in real-time by the image processor.

The method can comprise performing one or more of the following transforms to said first image and/or to said second image: image rotation, scaling, cropping, magnification, skew correction and translation.

The composite image can be generated in dependence on positional data defining the relative position of the first and second cameras.

The method can comprise augmenting the composite image with one or more of the following:
 a graphical representation of the trailer being towed by the vehicle;
 a graphical representation of a projected path for the trailer during a reversing operation;
 a vehicle control instruction(s) to guide the trailer during a reversing operation; and
 proximity information for the trailer.

The method can comprise displaying the composite image, for example on a display screen. The display screen can be provided in a centre console or an instrument cluster. Alternatively, or in addition, the display screen can be incorporated into a rear view mirror.

According to a further aspect of the present invention there is provided a display system for generating a composite view of a region behind a vehicle towing a trailer, the display system comprising:
 a first camera for outputting first image data corresponding to a first image, the first camera being configured to be mounted in a rear-facing orientation to the vehicle;
 a second camera for outputting second image data corresponding to a second image, the second camera being configured to be mounted in a rear-facing orientation to the trailer;
 a first lateral camera for outputting first lateral image data corresponding to a first lateral image;

a second lateral camera for outputting second lateral image data corresponding to a second lateral image;

an image processor for receiving said first image data, said second image data, said first lateral image data and said second lateral image data;

wherein the image processor is configured to combine said first image data, said second image data, said first lateral image data and said second lateral image data to generate composite image data corresponding to a composite image. By incorporating the first and second lateral images into the composite image, the display system can provide a more comprehensive representation of the area around a vehicle and a trailer being towed by the vehicle. The first lateral image can comprise a first side of the trailer; and the second lateral image can comprise a second side of the trailer.

The image processor can be configured to combine said first image data, said second image data, said first lateral image data and said second lateral image data such that at least a portion of said first image is overlaid onto one or more of said second image, said first lateral image and said second lateral image. The at least a portion of said first image can, for example, be overlaid as a semi-transparent image onto one or more of said second image, said first lateral image and said second lateral image.

The image processor can be configured to form an intermediate composite image by combining one or more of the following: the second image, the first lateral image and the second lateral image. The first lateral image can be disposed on a first side of the second image. The second lateral image can be disposed on a second side of the second image. The image processor can perform one or more transform to match the second image to the first and second lateral images. The one or more transform can, for example, comprise translation, scaling, cropping and rotation. The image processor can be configured to overlay said at least a portion of the first image onto the intermediate composite image.

The image processor can be configured to identify one or more feature common to both said first image and said intermediate composite image. The image processor can be configured to match said first image and said intermediate composite image in dependence on the identified one or more feature.

The first lateral image and/or the second lateral image can have a vertical height substantially equal to a vertical height of the second image. The lateral image data can extend the full height of the composite image.

Alternatively, the first lateral image can have a vertical height which is less than a vertical height of the second image; and/or the second lateral image can have a vertical height which is less than a vertical height of the second image. The first and second lateral image data can have a smaller vertical extent. The region(s) above the first lateral image and/or the second lateral image data can be infilled with the second image data to create the composite image.

The first lateral image and/or the second lateral image can be inserted into the second image data to form said intermediate composite image. The images can be joined along boundaries, for example by stitching the images together.

The first lateral camera can be a first side-mounted camera. The second lateral camera can be a second side-mounted camera. The first side-mounted camera can be mounted to a first side of the vehicle. The second side-mounted camera can be mounted to a second side of the vehicle. In certain embodiments, the first side-mounted camera can be mounted to a first side of the trailer. The second side-mounted camera can be mounted to a second side of the trailer.

The image processor can be configured to perform one or more of the following transforms: image rotation, scaling, cropping, magnification, skew correction and translation. The one or more transform can be applied to one or more of the: first image, second image, first lateral image, and second lateral image.

The image processor can be configured to output the composite image data for display on a display screen.

According to a further aspect of the present invention there is provided a rig comprising a vehicle and a trailer, wherein the rig comprises a display system as claimed in any one of the preceding claims; wherein the first camera, the first lateral camera and the second lateral camera are mounted to the vehicle; and the second camera is mounted to the trailer.

According to a still further aspect of the present invention there is provided a method of generating a composite image of a region behind a vehicle towing a trailer, the method comprising:

using a first camera to generate a first image;
using a second camera to generate a second image;
using a first lateral camera to generate a first lateral image;
using a second lateral camera to generate a second lateral image;
using an image processor to combine said first image, said second image, said first lateral image and said second lateral image to form a composite image.

The method can comprise overlaying at least a portion of the first image onto one or more of said second image, said first lateral image and said second lateral image. The at least a portion of the first image can be overlaid as a semi-transparent image.

The method can comprise forming an intermediate composite image by combining one or more of the following: the second image, the first lateral image and the second lateral image. The at least a portion of the first image can be overlaid onto the intermediate composite image.

The method can comprise identifying one or more feature common to both said first image and said intermediate composite image. The first image and the intermediate composite image can be matched in dependence on the identified one or more feature.

The first lateral image and/or the second lateral image can have a vertical height substantially equal to a vertical height of the second image in said intermediate composite image.

Alternatively, the first lateral image can have a vertical height less than a vertical height of the second image; and/or the second lateral image can have a vertical height less than a vertical height of the second image. The method can comprise inserting the first lateral image and/or the second lateral image into the second image to form said intermediate composite image.

The method can comprise displaying the composite image data on a display screen.

The term processor is used herein to refer to one or more electronic processors. Similarly, the term system memory is used herein to refer to one or more storage devices. The processor can be a general purpose computational device configured to execute a set of software instructions to perform the method(s) described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A rear-view display system 1 in accordance with an embodiment of the present invention will now be described with reference to the accompanying figures. The rear-view display system 1 is intended for use in a vehicle V towing a trailer T (referred to in combination as a rig) to generate a composite image for providing improved visibility for the vehicle driver of the region behind the vehicle V. The vehicle V in the present embodiment is an automobile or a utility vehicle. However, it will be appreciated that the rear-view display system 1 may be incorporated into other types of vehicle, such as a tractor unit.

Figure 1:
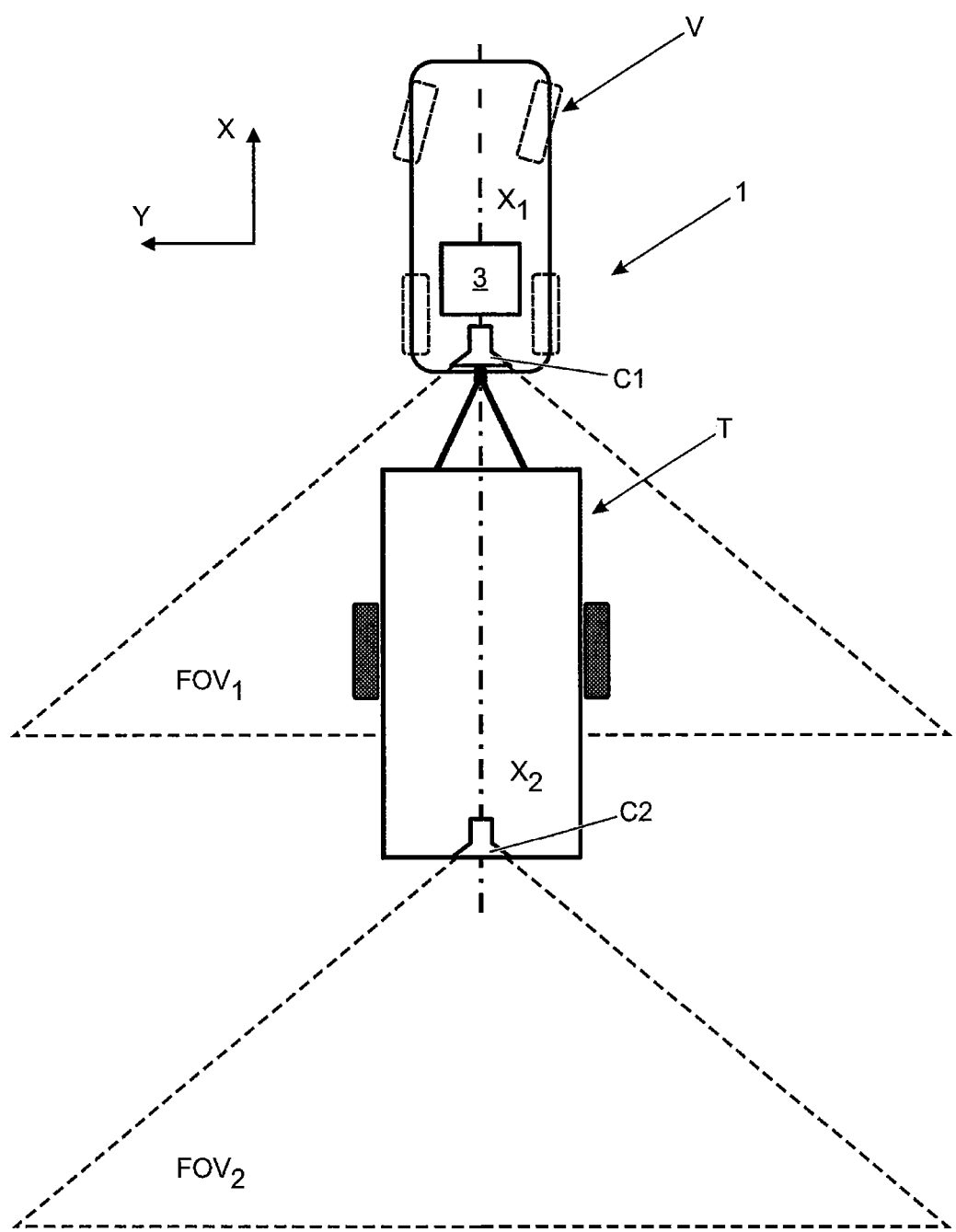
FIG. 1 shows a vehicle and a trailer incorporating a rear-view display system in accordance with an embodiment of the present invention.

The vehicle V has a first longitudinal axis $X_1$, and the trailer T has a second longitudinal axis $X_2$, as shown in FIG. 1. The terms "front" and "rear" are used herein in their conventional sense when defining the relative position of features on the vehicle V and the trailer T. The terms "rear-facing" and "rear-view" are used herein to refer to a position or orientation which is in a direction towards the back of the vehicle V or the trailer T.

Figure 2:
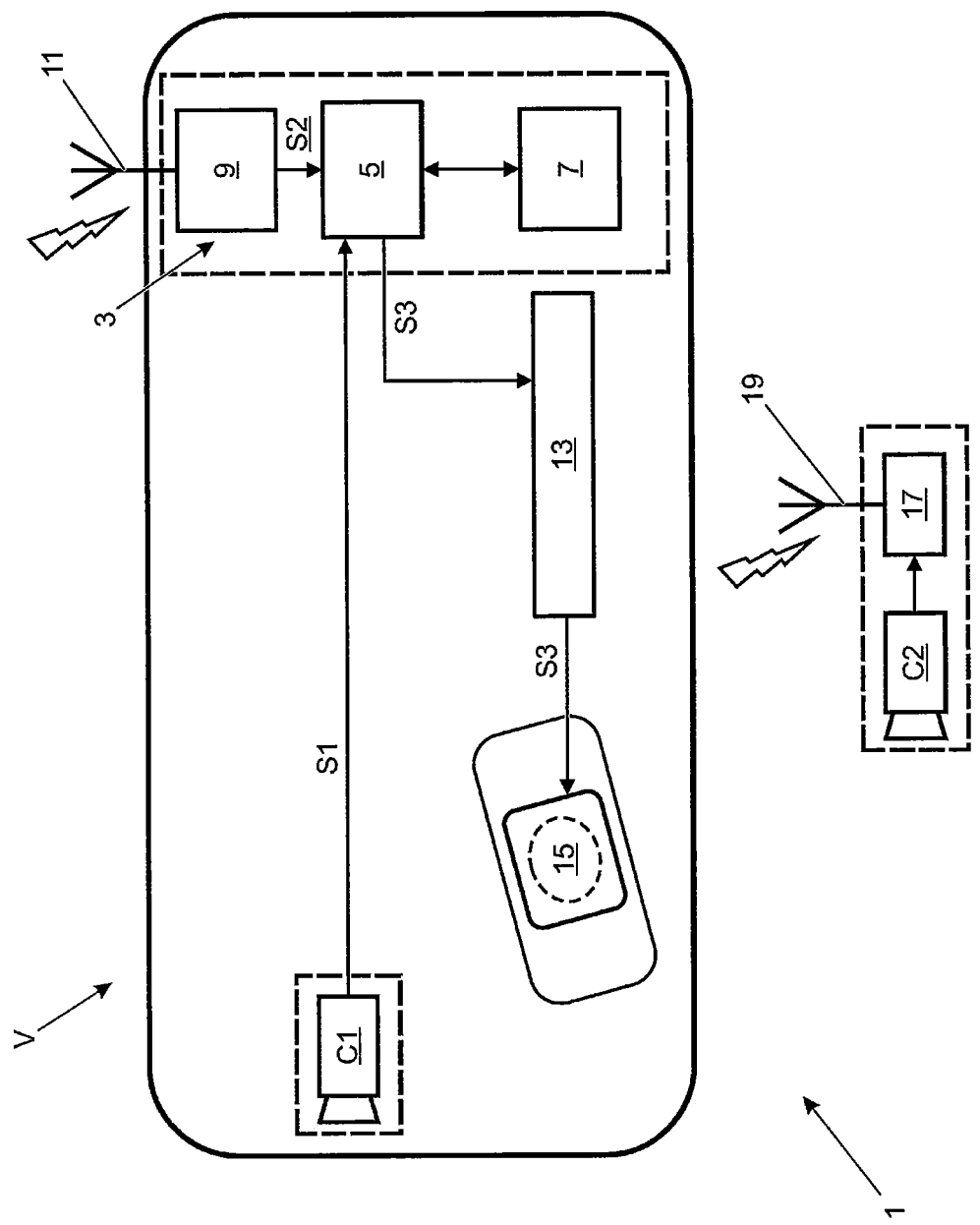
FIG. 2 shows a schematic representation of the components of the rear-view display system shown in FIG. 1.

As shown in FIG. 1, the rear-view display system 1 is in the form of a vehicle-mounted unit and a trailer-mounted unit. The vehicle-mounted unit comprises a central processing unit 3 connected to a first camera C1. As shown in FIG. 2, the central processing unit 3 comprises an image processor 5 coupled to system memory 7, and a wireless receiver 9 having a first antenna 11. The image processor 5 can be a digital image processor. The image processor 5 is configured to execute a set of software instructions held in the system memory 7. The image processor 5 is connected to a communication bus 13, such as the vehicle CAN bus, for communicating with other vehicle systems. The vehicle V comprises a display screen 15 on which the images received from the first and second cameras C1, C2 can be selectively displayed. The trailer-mounted unit comprises a second camera C2 connected to a wireless transmitter 17 having a second antenna 19.

The first and second cameras C1, C2 are both rear-facing digital cameras for generating video images. The first and second cameras C1, C2 each comprise a wide-angle lens to provide a viewing angle of approximately 130°. The first camera C1 is mounted centrally at the rear of the vehicle V above a rear license plate (not shown) and, in the present embodiment, can selectively function as a reversing camera to provide a parking aid when there is no trailer T coupled to the vehicle V. The second camera C2 is mounted centrally at the rear of the trailer T. The first camera C1 has a first field of view FOV1 (shown in FIG. 1) having a line of sight (i.e. a centreline) substantially coincident with the first longitudinal axis $X_1$. The second camera C2 has a second field of view FOV2 (shown in FIG. 1) having a line of sight (i.e. a centreline) substantially coincident with the second longitudinal axis $X_2$, for example above a license plate on the trailer T. The first and second cameras C1, C2 are arranged at approximately the same vertical height above ground level. In alternate arrangements, the first and second cameras C1, C2 can be offset from each other in a vertical and/or transverse direction. The image processor 5 can be configured to correct for any such positional offset. Equally, the image processor 5 can be configured to correct for an angular offset between the first and second cameras C1, C2, for example if one or both of the first and second cameras C1, C2 is angularly offset from the respective first and second longitudinal axes $X_1$, $X_2$.

The first camera C1 outputs a first signal S1 comprising first image data corresponding to a first image IMG1. The first signal S1 is published to the communication bus 13 and provides a first input for the image processor 5. The second camera C2 outputs a second signal S2 comprising the second image data corresponding to a second image IMG2. The second signal S2 is transmitted by the wireless transmitter 17 to the wireless receiver 9 to provide a second input for the image processor 5. The wireless transmitter 17 can transmit the second signal S2 using a suitable wireless communication standard, such as Wi-Fi®.

As outlined above, the first camera C1 is rear-facing and, when the vehicle V is towing the trailer T, the first image IMG1 contains the trailer T which partially obstructs the view afforded to the driver in a rearwards direction. The second camera C2 is mounted to the trailer T and the second image IMG2 provides an unobstructed view of the scene behind the trailer T. The image processor 5 is configured to combine the first image data and the second image data to generate composite image data. The composite image data corresponds to a composite image IMG3 formed from said first and second images IMG1, IMG2.

The image processor 5 modifies the first image data such that the first image IMG1 will be rendered as a semi-transparent image. For example, the image processor 5 can modify an alpha channel or an index transparency of the first image data. The first image data can be modified to provide a transparency of 25%, for example. The first image data and the second image data are combined to form a composite image IMG3. The image processor 5 can be configured to perform other image-manipulation techniques, for example to modify the colour and/or contrast of one or more image, for example to highlight an outline of the trailer T. The image processor 5 may also be configured to implement an edge-recognition algorithm to identify an outline of the trailer T for display in the composite image IMG3. The resulting composite image IMG3 comprises the second image IMG2 as a background element over which the first image IMG1 is overlaid. Significantly, the trailer T (which is present in the first image IMG1, but not the second image IMG2) is partially visible in the composite image IMG3 to facilitate determining its relative position to objects and/or other vehicles. The image processor 5 can perform additional blending or smoothing functions to obscure the transition between the first and second images IMG1, IMG2 in the composite image IMG3. The rear-view display system 1 may be configured to allow the user to select the modification to the first image data, for example to adjust a transparency setting of the first image data, to allow customisation of the composite image IMG3.

When the vehicle V and the trailer T are aligned with each other (such that the first and second longitudinal axes $X_1$, $X_2$ are coincident), the first and second images IMG1, IMG2 are in respect of the same scene albeit offset from each other due to the longitudinal offset between the first and second cameras C1, C2. Moreover, there may be a lateral offset and/or a vertical offset due to the positioning of the first and second cameras C1, C2 on the vehicle V and the trailer T. Accordingly, the first image IMG1 cannot be overlaid directly onto the second image IMG2. Rather, the image processor 5 is configured to implement an image matching procedure to align the first image IMG1 with the second image IMG2. The image processor 5 can implement a cross-correlation technique automatically to match features common to both the first image IMG1 and the second image IMG2. The image processor 5 can, for example, use a Hough transform feature extraction technique. The relative position and/or orientation of the identified features can be compared in the first and second images IMG1, IMG2. Alternatively, or in addition, the image processor 5 can identify the centroid of one or more image features and compare their relative position in the first and second images IMG1, IMG2. Other image analysis techniques that may be included are point mapping and/or edge-recognition. The image processor 5 can optionally perform image processing techniques with respect to time in order to track movement of the identified features in the first and second images. The image processor 5 may retrieve vehicle dynamic data published to the communication bus 13 to refine analysis of the image data. For example, the image processor 5 may optionally utilise the vehicle speed and/or turning angle during analysis of the image data. The image processor 5 may also be configured to determine the relative orientation of the trailer T by analysing a target 21 provided on the front of the trailer T. In the illustrated arrangement, the target 21 comprises three circles arranged in a triangular formation. The relative orientation of the trailer T can be characterised as a hitch angle $\theta$ defining the angular orientation of the centrelines of the vehicle V and the trailer T in a horizontal plane. The image processor 5 may also be configured to compensate for differences in the first and second images IMG1, IMG2 due to different specifications of the first and second cameras C1, C2.

The image processor 5 utilises the results of the cross-correlation to perform image registration such that the first and second images IMG1, IMG2 are aligned with each other. The image registration can comprise one or more of the following transforms: image rotation, scaling, cropping, magnification (zooming), skew correction and translation. It will be appreciated that the transform(s) required to match the first and second images IMG1, IMG2 depend on the relative positioning of the first and second cameras C1, C2. The transform(s) may be applied in two dimensions (2D) or three dimensions (3D), for example to compensate for an angular offset between the first and second longitudinal axes $X_1$, $X_2$ (in a horizontal plane and/or a vertical plane). As outlined above, the first image IMG1 data is modified such that the first image IMG1 appears semi-transparent when displayed. The first image IMG1 is then overlaid onto the second image IMG2 to form the composite image IMG3 (for example using alpha-compositing techniques). The image processor 5 can optionally edit the first image IMG1 such that only a portion thereof is overlaid onto the second image IMG2. A cropping function may be applied to a predefined region of the first image IMG1, for example having a predefined width and height. Alternatively, the image processor 5 may be configured to identify the trailer T within the first image IMG1 to generate a mask which is overlaid onto the second image IMG2.

Figure 3A:
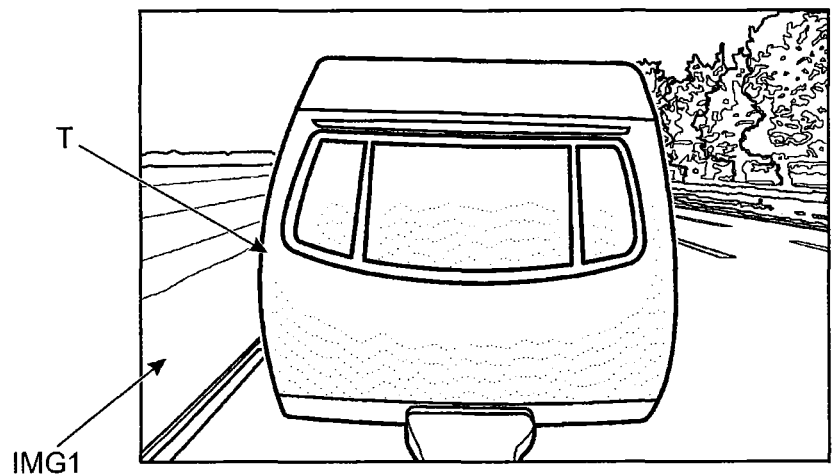
FIG. 3A shows a first image from a first camera disposed on the vehicle.
Figure 3B:
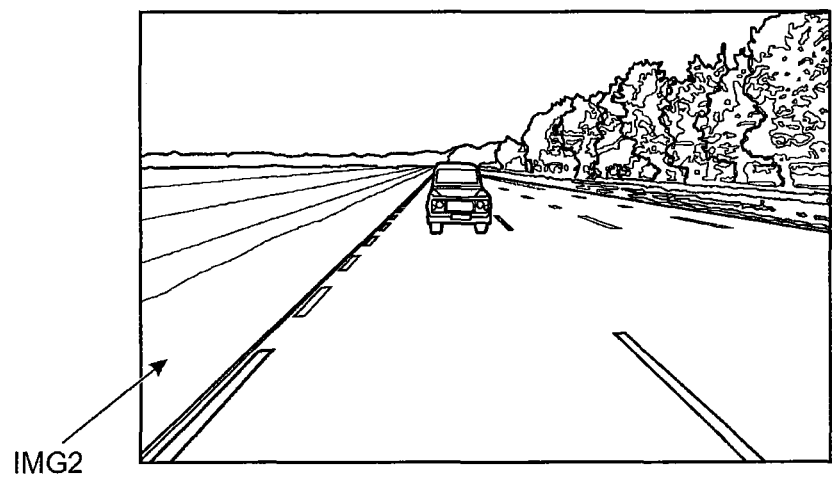
FIG. 3B shows a second image from a second camera disposed on the trailer.
Figure 3C:
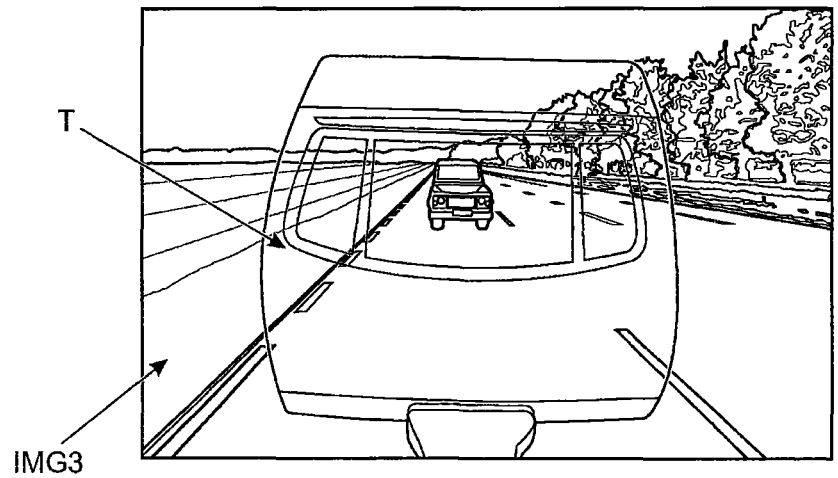
FIG. 3C shows a composite image generated by combining the first and second images shown in FIGS. 3A and 3B.

The operation of the rear-view display system 1 in accordance with an embodiment of the present invention will now be described with reference to FIGS. 3A, 3B and 3C. The first camera C1 generates first image data corresponding to a first image IMG1 which includes the trailer T being towed behind the vehicle V, as shown in FIG. 3A. The second camera C2 generates second image data corresponding to a second image IMG2 which is an unobstructed view of the region behind the trailer T, as shown in FIG. 3B. The image processor 5 implements an image matching procedure to match (align) the first and second images IMG1, IMG2, as described herein. The image processor 5 modifies the first image data such that the first image IMG1 will be displayed as a partially transparent image. The first image data and the second image data is then combined to form composite image data. The composite image data corresponds to a composite image IMG3 comprising the first image IMG1 overlaid onto the second image IMG2, as shown in FIG. 3C. The trailer T appears as a 'ghost' image or grind of the composite image IMG3. The resulting composite image IMG3 provides a clear view of the region behind the trailer T whilst retaining sufficient details of the trailer T to enable the driver to determine its relative position to obstacles and other vehicles.

The composite image IMG3 is output for display on a display screen, such as a liquid-crystal display, provided in the vehicle. The display screen can, for example, be provided in a centre console or in an instrument cluster. Alternatively, or in addition, the display screen can be incorporated into a rear view mirror, for example to display the composite image IMG3 alongside a reflective image.

If the angular offset between the first and second longitudinal axes $X_1$, $X_2$ becomes excessive, for example during a turning manoeuvre, the image processor 5 may be unable to match the first and second images. The image processor 5 may be configured to activate one or more side-mounted cameras (on the vehicle V and/or the trailer T) to obtain different images for processing. If this function is not available, the image processor 5 can output a notification to the vehicle driver that the rear-view display function is not available.

Figure 4:
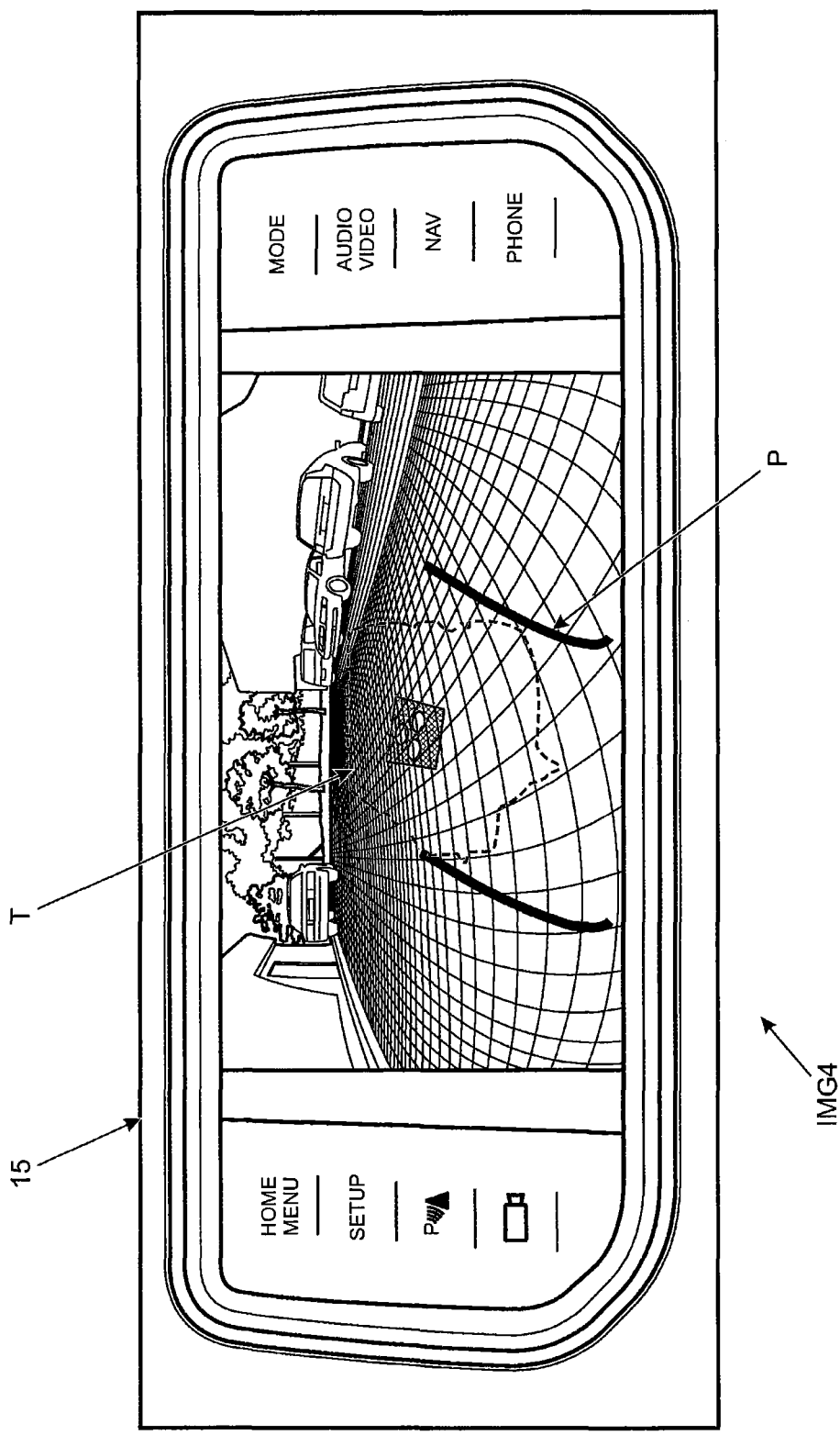
FIG. 4 shows an augmented composite image generated by the rear-view display system shown in FIG. 1.

The rear-view display system 1 described herein can be modified to display additional information. By way of example, the composite image IMG3 can be augmented by displaying a projected path P which the trailer T will follow during a reversing procedure. The projected path P can be overlaid onto the composite image IMG3 when the vehicle V is placed in reverse and the trailer T is detected. The driver can use the projected path P to control the trailer T when the vehicle V is being reversed. An illustration of an augmented composite image IMG4 is shown in FIG. 4 by way of example. Moreover, the rear-view display system 1 may be modified to display driver instructions, for example to provide vehicle control instructions (steering angle and/or transmission selection) for guiding the trailer T to an identified parking area. Further details of a vehicle control system for controlling a vehicle to facilitate parking a trailer are known from the applicant's earlier UK patent application GB1312036.5 filed on 4 Jul. 2013), the contents of which are incorporated herein in their entirety by reference.

In the illustrated example, the vehicle V is an automobile (for example a sports utility vehicle) and the trailer T is a caravan. It will be appreciated, however, that the apparatus and method(s) described herein are not limited in this respect and may be implemented in other types and categories of vehicle and to other types of trailer. The apparatus and method(s) could, for example, be applied to an articulated vehicle, a semi-trailer or a tractor-trailer.

It will be appreciated that further changes and modifications can be made to the apparatus and method described herein without parting from the scope of the present invention. A rear-view display system 1 has been described herein with reference to a single first camera C1 disposed on the vehicle V and a single second camera C2 disposed on the trailer T. It will be appreciated that more than one rear-facing camera may be provided on the vehicle V and/or the trailer T. By providing more than one camera, the composite image IMG3 may provide a greater sense of depth perception.

The rear-view display system 1 can be configured to overlay the first image IMG1 onto the second image IMG2 when the vehicle V is travelling in a forwards direction such that the composite image IMG3 is displayed to enable the driver to identify other vehicles behind the trailer T. Alternatively, the rear-view display system 1 may be configured to overlay the first image IMG1 onto the second image IMG2 only when the vehicle is parked or during a parking operation, for example when the transmission of the vehicle V is placed in reverse.

Furthermore, rather than overlaying the first image onto the second image, a graphical representation of the trailer (for example a silhouette or an outline of the trailer T, or a graphical indicia) may be overlaid onto the second image. Alternatively, a mask of the trailer T may be generated based on a static image generated by the first camera C1 and overlaid onto the second image generated by the second camera C2.

The rear-view display system 1 has been described with reference to a first camera C1 mounted to the rear of the vehicle V. In an alternate arrangement, the rear-view display system 1 can comprise a first side-mounted camera mounted to a first side of the vehicle and/or a second side-mounted camera mounted to a second side of the vehicle V. The first and second side-mounted cameras would be rearward-facing, for example mounted to the side (wing) mirrors. The first side-mounted camera and/or the second side-mounted camera may be used in conjunction with the vehicle-mounted first camera C1 and/or the trailer-mounted second camera C2. In particular, the image processor 5 can be arranged to combine the first image IMG1 and/or the second image IMG2 with an image generated by the first side-mounted camera and/or the second side-mounted camera. The image processor 5 may utilise the image(s) from the first side-mounted camera and/or the second side-mounted camera to provide a partially transparent overlay on the first image IMG1 and/or the second image IMG2. In this arrangement, the partially transparent overlay can comprise a side view of the vehicle V, for example a view of a rear quarter of the vehicle V. It will be appreciated that this arrangement may be used when the vehicle V is not towing a trailer T, so the second camera C2 may be omitted. The resulting composite image IMG3 may be used during parking or reversing manoeuvres to provide a substantially uninterrupted view of the area behind the vehicle V. By displaying the image from the first side-mounted camera and/or the second side-mounted camera as a partially transparent overlay, the driver can be provided with an indication of the extent of the vehicle V to facilitate judgement of distances and/or position. The composite image IMG3 may be output to a display provided, for example, in the centre console, the instrument cluster, the rear view mirror or a side mirror display.

Figure 5:
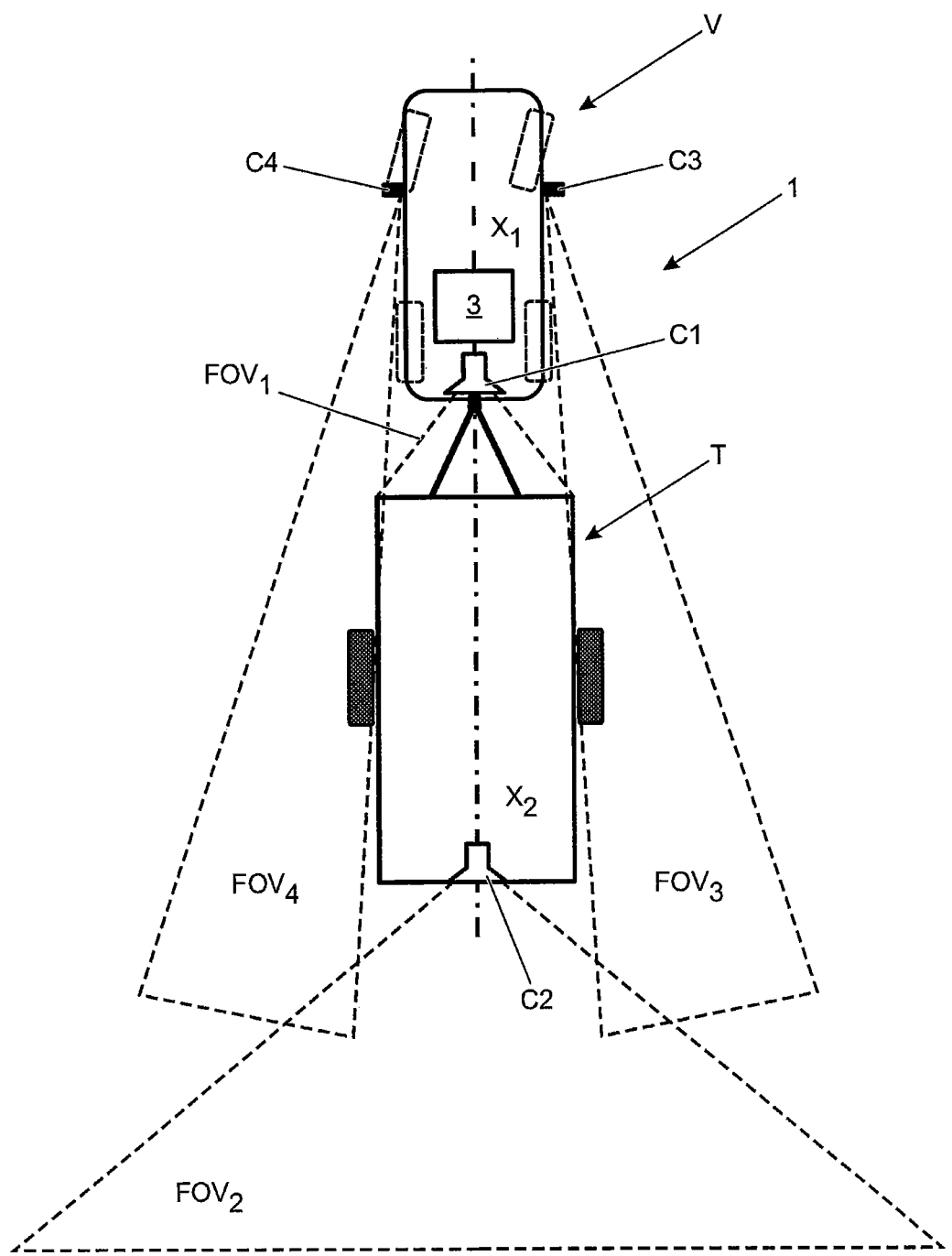
FIG. 5 shows a vehicle and a trailer incorporating an alternate arrangement of the rear-view display system.
Figure 6:
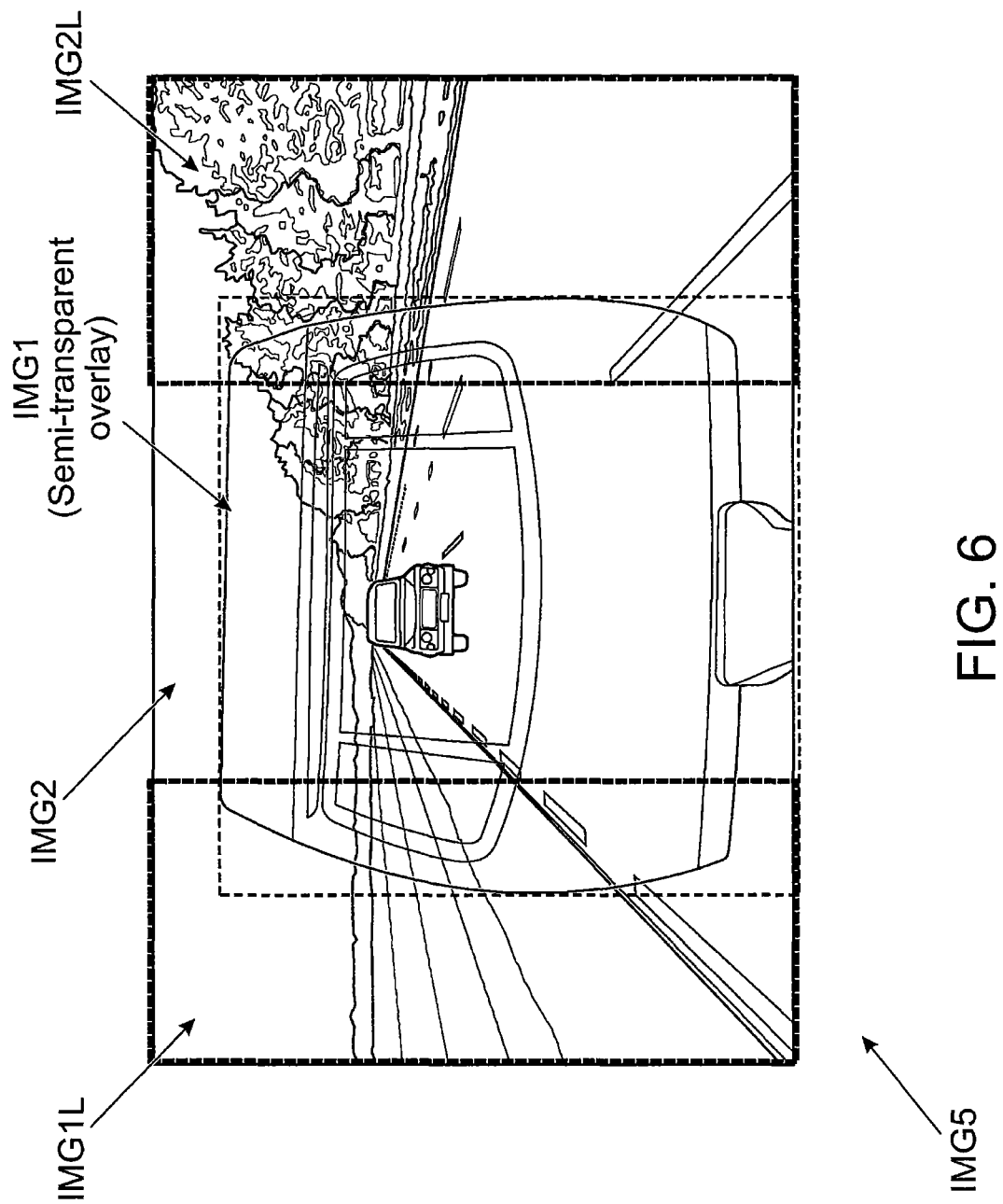
FIG. 6 illustrates the formation of a composite image incorporating image data from the cameras in the alternate arrangement shown in FIG. 5.

The alternate arrangement of the rear-view display system 1 is illustrated in FIG. 5; and the formation of a composite image from the image data generated by the cameras is shown in FIG. 6. The rear-view display system 1 comprises a first side-mounted camera C3 mounted to a first side of the vehicle V; and a second side-mounted camera C4 mounted to a second side of the vehicle V. The first and second side-mounted cameras C3, C4 are mounted to the side (wing) mirrors and have respective third and fourth fields of vision $FOV_3$, $FOV_4$. As shown in FIG. 5, the third and fourth fields of vision $FOV_3$, $FOV_4$ extend along the respective sides of the vehicle V. This arrangement is advantageous since it can provide coverage of the lateral regions of the trailer T. This is particularly relevant since the front of the trailer T may obscure portions of the images generated by the first camera C1. Similarly, the images generated by the second camera C2 do not provide coverage along the sides of the trailer T. Consequently, there may be regions along the sides of the trailer T, particularly towards the rear, which are not covered by either of the first and second cameras C1, C2. The composite image IMG3 may therefore include blind spots. Furthermore, the presence of these blind spots may not be immediately apparent when viewing the composite image IMG3 since the trailer T is displayed as a semi-transparent 'ghost' image which may give the impression of an uninterrupted view. The first and second side-mounted cameras C3, C4 generate first and second lateral images IMG1L, IMG2L which can provide improved coverage on each side of the trailer T. As illustrated in FIG. 5, the third and fourth fields of vision $FOV_3$, $FOV_4$ can extend along each side of the trailer T at least when the vehicle V is travelling in a straight line.

As illustrated in FIG. 6, a second composite image IMG5 is formed comprising the first and second lateral images IMG1L, IMG2L and the first and second images IMG1, IMG2. The components of the second composite image IMG5 are illustrated in FIG. 6. The first and second lateral images IMG1L, IMG2L are combined with the second image IMG2, for example by stitching the first and second lateral images IMG1L, IMG2L and the second image IMG2. The image processor 5 can be configured to join the first and second lateral images IMG1L, IMG2L and the second image IMG2 at predefined boundaries or at dynamically determined boundaries, for example determined in dependence on identification of one or more common feature in the images. In the present embodiment, the first and second lateral images IMG1L, IMG2L are stitched to the left and right hand sides respectively of the second image IMG2 along vertical boundaries. As illustrated in FIG. 6, the first and second lateral images IMG1L, IMG2L extend vertically for the full height of the second composite image IMG5. The first image IMG1 is then overlaid onto an intermediate composite image formed by combining the second image IMG2 and the first and second lateral images IMG1L, IMG2L. As in the previous embodiment, the first image IMG1 is overlaid as a semi-transparent image onto the intermediate composite image. In particular, the image processor 5 modifies the first image data such that the first image IMG1 is displayed as a partially transparent image which overlies a portion of each of the second image IMG2 and the first and second lateral images IMG1L, IMG2L. In a variant, the first image IMG1 may be overlaid onto the second image IMG2 which is then combined with the first and second lateral images IMG1L, IMG2L.

In a variant of the arrangement described above with reference to FIGS. 5 and 6, the first and second side-mounted cameras C3, C4 each comprise a wide-angle lens, for example a fish-eye lens, and are arranged to generate respective first and second lateral images IMG1L, IMG2L extending along the sides of the vehicle V and the trailer T. The first and second side-mounted cameras C3, C4 can have a view angle of 200° or more. The first and second side-mounted cameras C3, C4 are arranged such that their respective focal centrelines are directed downwardly. The first and second side-mounted cameras C3, C4 are mounted to the side (wing) mirrors and have respective third and fourth fields of vision $FOV_3$, $FOV_4$. The third and fourth fields of vision $FOV_3$, $FOV_4$ extend along the respective sides of the vehicle V. The resulting first and second lateral images IMG1L, IMG2L encompass a region extending from the front to the rear of the vehicle V. The resulting first and second lateral images IMG1L, IMG2L can be used by other vehicle systems, for example to assist with vehicle parking and/or to identify other vehicles at a road junction. Due to the arrangement of the first and second side-mounted cameras C3, C4, the first and second lateral images IMG1L, IMG2L typically only comprise a low-level region alongside the trailer T, for example a region below a horizontal plane in which the first and second side-mounted cameras C3, C4 are disposed. A third composite image IMG6 is formed taking account of this limitation of the vertical extent of the first and second lateral images IMG1L, IMG2L.

Figure 7:
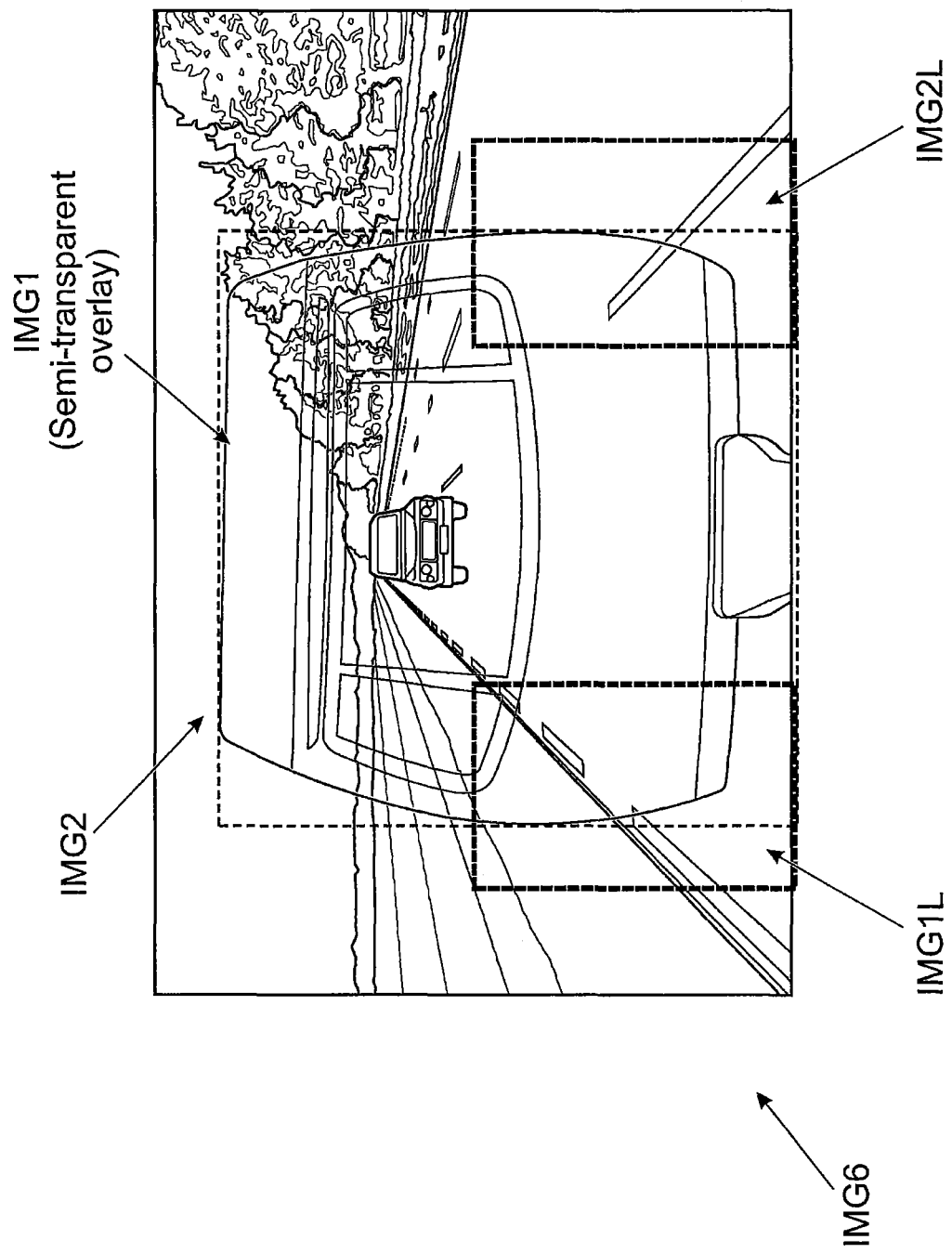
FIG. 7 illustrates an alternate formation of a composite image incorporating image data from the cameras in the alternate arrangement shown in FIG. 5.

The third composite image IMG6 comprises the first and second lateral images IMG1L, IMG2L and the first and second images IMG1, IMG2. The components of the third composite image IMG6 are illustrated in FIG. 7. The first and second lateral images IMG1L, IMG2L are combined with the second image IMG2 to form an intermediate composite image. The combination can, for example, comprise stitching the first and second lateral images IMG1L, IMG2L and the second image IMG2. The region in the third composite image IMG6 vertically above the first and second lateral images IMG1L, IMG2L is formed from the second image IMG2. The first image IMG1 is then overlaid onto the intermediate composite image formed by combining the second image IMG2 and the first and second lateral images IMG1L, IMG2L. The first image IMG1 is overlaid as a semi-transparent image. In particular, the image processor 5 modifies the first image data such that the first image IMG1 is displayed as a partially transparent image which overlies a portion of each of the second image IMG2 and the first and second lateral images IMG1L, IMG2L.

The present invention has been described with reference to first and second side-mounted cameras C3, C4 mounted to the wing mirrors. It will be appreciated that the first and second side-mounted cameras C3, C4 may be incorporated into towing mirrors for mounting to the wing mirrors of the vehicle V. Alternatively, the first and second side-mounted cameras C3, C4 may be mounted in other locations on the vehicle, for example on left and right sides of a rear bumper of the vehicle. Alternatively, the first and second rear-mounted cameras C3, C4 may be incorporated into a lamp housing, for example a side indicator housing or a rear lamp housing.

In a further variant of the present invention, the first and second side-mounted cameras C3, C4 may be mounted to the trailer T rather than to the vehicle V. For example, the first and second side-mounted cameras C3, C4 may be mounted at the front of the trailer T in a rearwards-facing orientation. It will be appreciated that the first and second lateral images IMG1L, IMG2L may be used by other vehicle systems, for example to facilitate maneuvering and/or parking of the trailer T.

In a still further variant, the vehicle V can comprise first and second rear-mounted cameras for generating first and second rear images. The first and second rear-mounted cameras could, for example, be disposed in a rear quarter of the vehicle V. The first and second rear-mounted cameras may be mounted in the rear bumper of the vehicle V; within left and right rear-light clusters; within left and right roof bars; or at the outer ends of a roof spoiler. The first and second rear-mounted cameras have respective fields of view directed behind the vehicle V. The first and second rear images may be combined with the second image IMG2 generated by the second camera C2 disposed at the rear of the trailer T. In this arrangement, the fields of view of the first and second rear-mounted cameras may encompass at least a portion of the front of the trailer T. The image processor 5 can be configured to render the portion of the first and second rear images corresponding to the trailer T as a semi-transparent image which is overlaid onto the second image IMG2. The extent of the first rear image IMG1 which is overlaid as a semi-transparent image could, for example, be determined in dependence on a determined hitch angle θ of the trailer T. Alternatively, or in addition, the image processor 5 may implement an edge-locating algorithm or a shape-recognition algorithm to determine the extent of the trailer T. It will be appreciated that the composite image may be formed in conjunction with the first image IMG1, or without the first image IMG1. Thus, in certain arrangements, the first camera C1 may be omitted.

A variant of the embodiment above in which the first and second side-mounted cameras C3, C4 are used to generate first and second lateral images IMG1L, IMG2L will now be described with references to FIGS. 8 and 9. Like references will be used for like components when describing this variant.

The image processor 5 is configured to generate a fourth composite image IMG7 in dependence on a hitch angle θ and optionally also a pitch angle α of the trailer T. The hitch angle θ and the pitch angle α define the angular orientation of the trailer T relative to the vehicle V. Specifically, the hitch angle θ and the pitch angle α are defined with reference to a reference frame of the vehicle V. The hitch angle θ defines the angular offset between the first longitudinal axis $X_1$ and the second longitudinal axis $X_2$ in a horizontal plane. The pitch angle α defines the angular offset between the first longitudinal axis $X_1$ and the second longitudinal axis $X_2$ in a vertical plane. In the present embodiment, the hitch angle θ and the pitch angle α are determined by tracking a target 21 disposed on the front of the trailer T. Specifically, the image processor 5 analyses the first image IMG1 to identify the target 21 and to determine its position and orientation relative to the vehicle V. The hitch angle θ and the pitch angle α can thereby be determined using image processing techniques.

Figure 8:
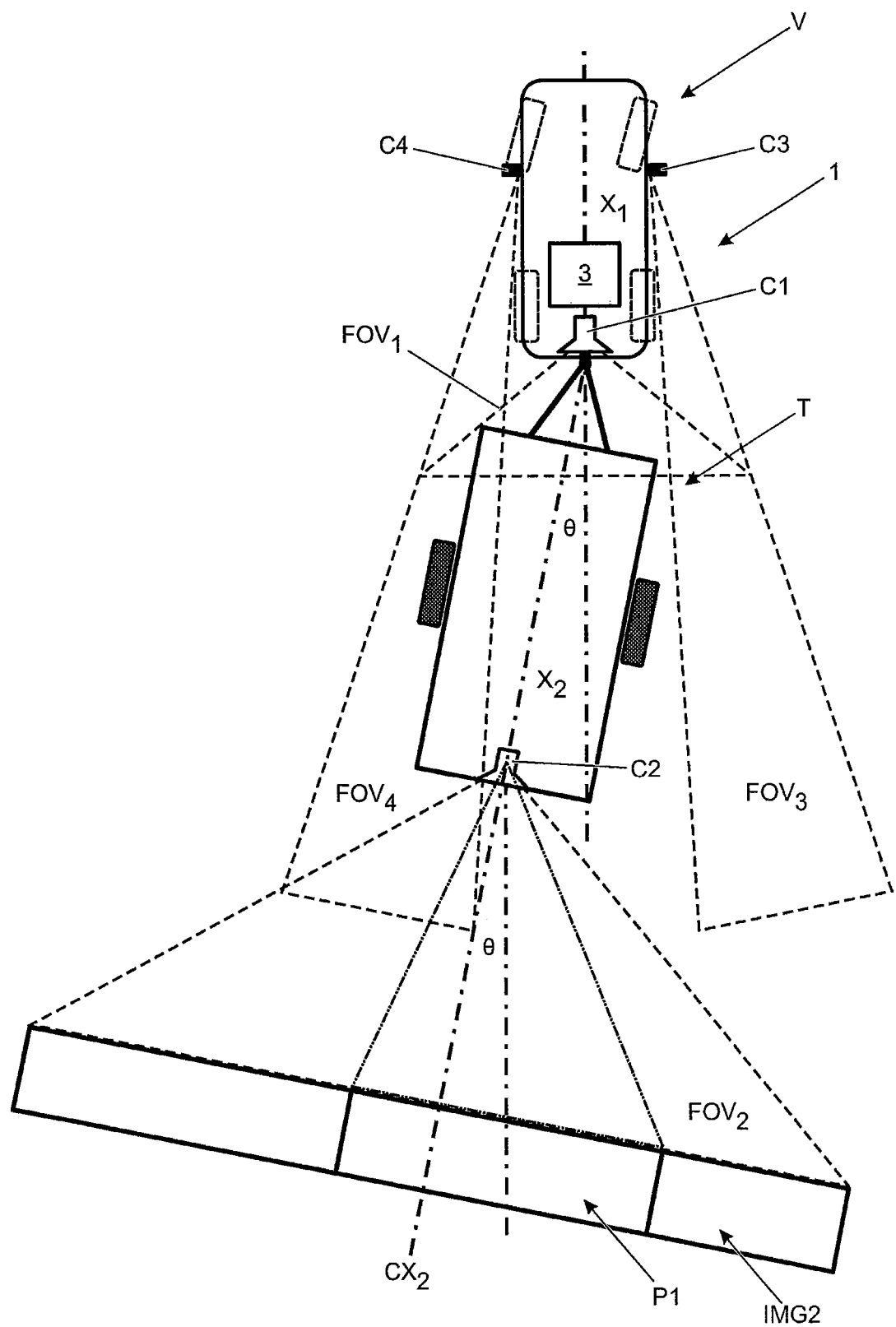
FIG. 8 illustrates the formation of a composite image incorporating image data from the cameras in the alternate arrangement shown in FIG. 5.
Figure 9:
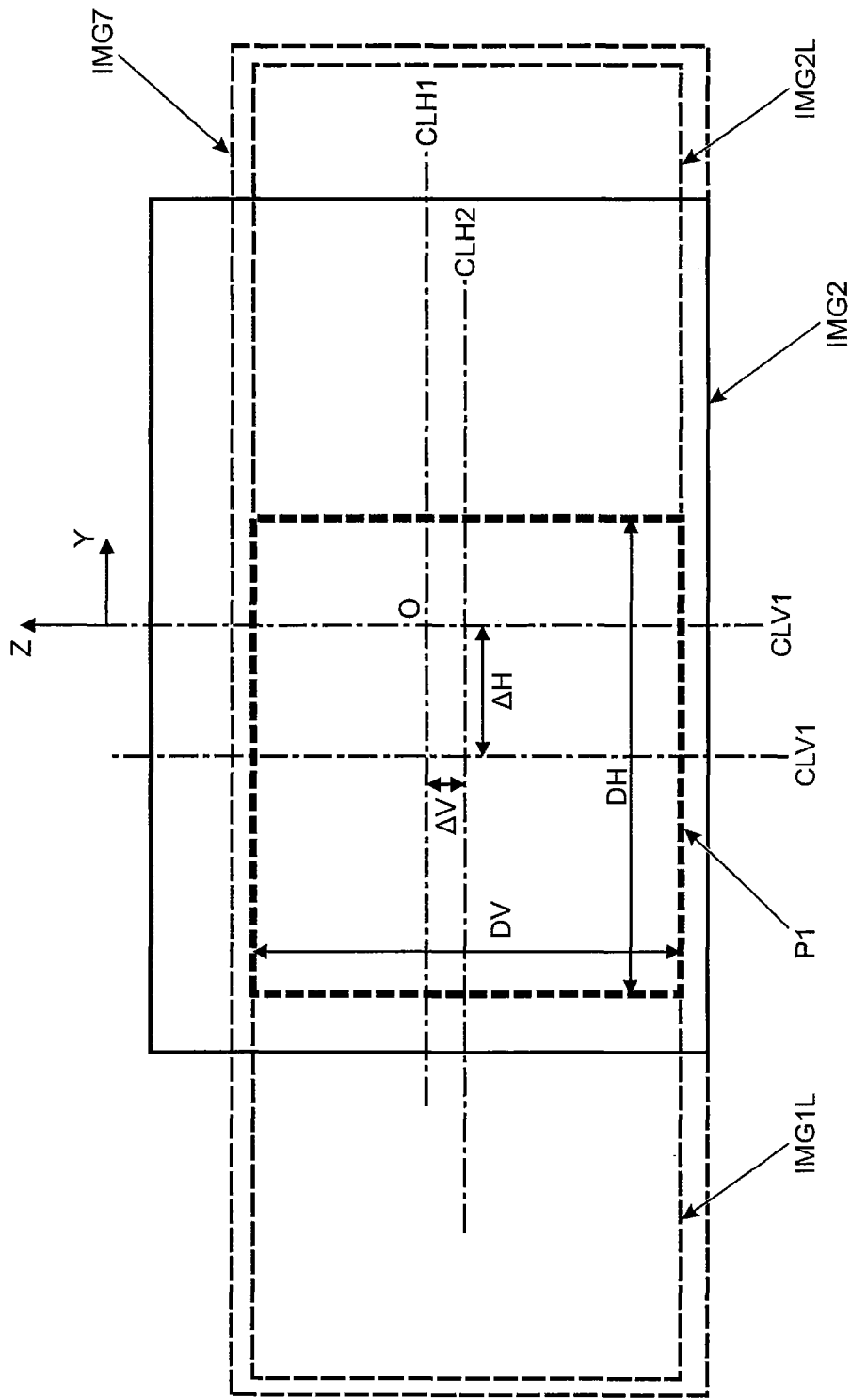
FIG. 9 illustrates the composition of the composite image using the formation shown in FIG. 8.

As shown in FIG. 8, the second camera C2 is mounted to the trailer T in a rear-facing orientation, typically at the rear of the trailer T. The second image IMG2 encompasses a region behind the trailer T and is referred to as a rear image. As shown in FIG. 9, the second image IMG2 has a horizontal dimension DH and a vertical dimension DV. The second image IMG2 has a first horizontal centreline CLH1 and a first vertical centreline CLV1. The first horizontal centreline CLH1 and the first vertical centreline CLV1 are virtual reference lines which bisect the second image IMG2 horizontally and vertically. The second camera C2 is fixedly mounted to the trailer T and has a central focal axis CX2. The second camera C2 is arranged such that the central focal axis CX2 is arranged substantially parallel to the second longitudinal axis $X_2$, but corrections can be applied to the second image IMG2 to allow for any angular offset and/or translational offset from said second longitudinal axis $X_2$. A virtual origin O is defined by the first horizontal centreline CLH1 and the first vertical centreline CLV1. The virtual origin O is coincident with the central focal axis CX2 of the second camera C2.

It will be appreciated that the orientation of the central focal axis CX2 relative to the reference frame defined for the vehicle V varies in dependence on the hitch angle θ and the pitch angle α of the trailer T. Thus, the content of the second image IMG2 varies in dependence on the orientation of the trailer T. As a result, there can be a discrepancy between the second image IMG2 and the first and second lateral images IMG1L, IMG2L (which are generated by the side-mounted third and fourth cameras C3, C4 mounted to the vehicle V). In order to compensate for this discrepancy, the image processor 5 is configured to select a sub-section P1 of the second image IMG2 for incorporation into the fourth composite image IMG7. The sub-section P1 is selected from within the second image IMG2 to compensate for changes in the hitch angle θ and the pitch angle α. By compensating for these angular changes, the fourth composite image IMG7 formed by the image processor 5 can provide a substantially continuous view of the image behind the vehicle V. The sub-section P1 has a second horizontal centreline CLH2 and a second vertical centreline CLV2. The second horizontal centreline CLH2 and the second vertical centreline CLV2 are virtual reference lines which bisect the sub-section P1 horizontally and vertically. If a predefined section of the second image IMG2 was used to form the fourth composite image IMG7, discontinuities would be introduced into the fourth composite image IMG7 as the hitch angle θ and/or pitch angle α changed. Due to the overlaying technique described herein to display a portion of the first image IMG1 as a semi-transparent image, any such discontinuities may potentially be obscured, which may result in the formation of one or more blind spot in the resulting composite image.

The selection of the sub-section P1 will now be described in more detail with reference to FIG. 9. In the present arrangement, the horizontal dimension DH and the vertical dimension DV of the sub-section P1 are fixed, i.e. the sub-section P1 has a predefined size. However, the image processor 5 is configured to vary the position of the sub-section P1 within the second image IMG2 in dependence on the hitch angle θ and the pitch angle α. The image processor 5 determines a negative equivalent of the hitch angle θ and the pitch angle α (by multiplying by −1), thereby changing the sign of the respective angles. The image processor 5 determines the location of the sub-section P1 within the second image IMG2 in dependence on the determined negative of the hitch angle θ and the pitch angle α. Specifically, the image processor 5 modifies the offset between the first and second horizontal centrelines CLH1, CLH2 in dependence on the determined negative of the hitch angle θ; and between the first and second vertical centrelines CLV1, CLV2 in dependence on the determined negative of the pitch angle α. A horizontal offset ΔH between the first vertical centreline CLV1 and the second vertical centreline CLV2 is determined in direct proportion to the determined negative of the hitch angle θ. Similarly, a vertical offset ΔV between the first horizontal centreline CLH1 and the second vertical horizontal centreline CLH2 is determined in direct proportion to the determined negative of the pitch angle α. When the hitch angle θ is zero, the first and second vertical centrelines CLV1, CLV2 are aligned. When the pitch angle α is zero, the first and second horizontal centrelines CLH1, CLH2 are aligned. The extent of the horizontal and/or vertical translation of the sub-section P1 for a given angular change can be determined with reference to a virtual image plane. The virtual image plane can be defined at a known position along the central focal axis CX2 of the second camera C2. The image processor 5 can then combine the selected sub-section P1 with the first and second lateral images IMG1L, IMG2L. The first image IMG1 is overlaid as a semi-transparent image to form the fourth composite image IMG7. In certain embodiments, the fourth composite image IMG7 may be formed without overlaying the first image IMG1.

To compensate for the angular change, the image processor 5 can also apply one or more image correction transform to the sub-section P1, for example to de-skew the image or to correct a perspective shift. The image correction transform can also be dependent on the hitch angle θ and/or the pitch angle α. An image correction transform may also be applied to compensate for optical distortion within the third camera C3.

In the above variant, the transverse and vertical dimensions of the sub-section P1 are predefined. However, the image processor 5 may be modified also to vary a horizontal dimension DH and/or a vertical dimension DV of the sub-section P1 in dependence on the hitch angle θ and/or the pitch angle α. Specifically, the horizontal dimension DH may be varied in direct proportion to the hitch angle θ; and/or the vertical dimension DV may be varied in direct proportion to the pitch angle α. By varying the dimensions of the sub-section P1, regions of the first and second lateral images IMG1L, IMG2L generated by the second and third cameras C2, C3 which might otherwise be obscured by the trailer T (for example as the hitch angle θ increases) can be incorporated into sub-section P1. The changes in the horizontal dimension DH can be symmetrical about a first vertical reference line corresponding to the negative equivalent of the hitch angle θ; and/or the changes in the vertical dimension DV can be symmetrical about a first horizontal reference line corresponding to the negative equivalent of the pitch angle α. Alternatively, the changes in the horizontal dimension DH can be asymmetrical about the first vertical reference line corresponding to the negative equivalent of the hitch angle θ; and/or the changes in the vertical dimension DV can be asymmetrical about the first horizontal reference line corresponding to the negative equivalent of the pitch angle α. It will be appreciated that the extent of the variations in the horizontal dimension DH and/or the vertical dimension DV may vary depending on the trailer configuration, for example its external dimensions and/or axle location.

A similar technique may be applied to modify the first image IMG1 prior to overlaying the first image IMG1. For example, the first image IMG1 may be cropped in a transverse direction in dependence on the hitch angle θ.

A modification of the above embodiment may comprise changing the horizontal dimension DH of the sub-section P1 about the first vertical centre line CLV1; and/or changing the vertical dimension DV of the sub-section P1 about the first horizontal centre line CLH1. The changes in the horizontal dimension DH and/or the vertical dimension DV can be symmetrical. Alternatively, the changes can be implemented asymmetrically.

It will be appreciated that other techniques can be used to determine the hitch angle θ, for example by directly measuring the angular orientation of a trailer hitch relative to a ball joint mounted to the vehicle. For example, the image processor 5 may be configured to select sub-sections of the first and second lateral images IMG1L, IMG2L in dependence on the hitch angle of the trailer T.

The invention claimed is:

1. A display system for generating a composite rear view of a scene behind a vehicle towing a trailer, the display system comprising:
a first camera configured to be mounted at the rear of the vehicle in a rear-facing orientation and further configured to provide first image data corresponding to a first image that includes a rear-facing, non-top-down view of the scene behind the vehicle, in which the first image includes a rear-facing, non-top-down view of the trailer, which obstructs a portion of the scene behind the vehicle, wherein the first camera has a first field of view having a line of sight substantially coincident with a first longitudinal axis;
a second camera configured to be mounted to the trailer in a rear-facing orientation and further configured to provide second image data corresponding to a second image that includes a rear-facing, non-top-down view of the scene behind the vehicle, in which the portion of the scene obstructed by the trailer in the first image is not obstructed by the trailer, wherein the second camera has a second field of view having a line of sight substantially coincident with a second longitudinal axis;
a third camera configured to be mounted at a first side of the vehicle and further configured to provide first lateral image data corresponding to a first lateral image that includes a rear-facing, non-top-down view of the scene behind the vehicle;
a fourth camera configured to be mounted at a second side of the vehicle and further configured to provide second lateral image data corresponding to a second lateral image that includes a rear-facing, non-top-down view of the scene behind the vehicle; and
an image processor for receiving the first image data, the second image data, the first lateral image data, and the second lateral image data,
wherein the image processor is configured to:
combine the first image data and the second image data to create a third image containing the second image and only the rear-facing, non-top-down view of the trailer from the first image with the trailer appearing as a ghost image in the third image, and
responsive to an excessive angular offset between the first longitudinal axis and the second longitudinal axis, correct for the angular offset in the third image using at least one of the first lateral image data and the second lateral image data.

2. The display system of claim 1, wherein the image processor is configured to analyze the first image data and the second image data to identify one or more features common to both the first image and the second image.

3. The display system of claim 2, wherein the image processor is configured to match the first image and the second image in dependence on the identified one or more features.

4. The display system of claim 1, wherein the image processor is configured to generate the composite image in dependence on positional data defining a relative position of the first and second cameras.

5. The display system of claim 1, wherein the image processor is configured to augment the composite image with one or more of the following:
a graphical representation of a projected path for the trailer during a reversing operation;
a vehicle control instruction to guide the trailer during a reversing operation; and
proximity information for the trailer.

6. The display system of claim 1, wherein the image processor is configured to output the composite image data for display on a display screen.

7. The display system of claim 1,
wherein the first lateral image has a vertical height substantially equal to or less than a vertical height of the second image; and/or
wherein the second lateral image has a vertical height substantially equal to or less than a vertical height of the second image.

8. The display system of claim 1, wherein the ghost image of the trailer in the third image includes a silhouette of the trailer or an outline of the trailer.

9. A method of generating a composite rear view image of a scene behind a vehicle towing a trailer, the method comprising:
receiving a first image from a first camera, wherein the first camera is mounted at the rear of the vehicle in a rear-facing orientation to provide a rear-facing, non-top-down view of the scene behind the vehicle, in which the first image includes a rear-facing, non-top-down view of the trailer, which obstructs a portion of the scene behind the vehicle, wherein the first camera has a first field of view having a line of sight substantially coincident with a first longitudinal axis;
receiving a second image from a second camera, wherein the second camera is mounted to the trailer to provide a rear-facing, non-top-down view of the scene behind the trailer, in which the portion of the scene obstructed by the trailer in the first image is not obstructed by the trailer, wherein the second camera has a second field of view having a line of sight substantially coincident with a second longitudinal axis;
receiving a first lateral image from a third camera, wherein the third camera is mounted at a first side of the vehicle to provide a rear-facing, non-top-down lateral view of the scene behind the vehicle;
receiving a second lateral image from a fourth camera, wherein the fourth camera is mounted at a second side of the vehicle to provide a rear-facing, non-top-down lateral view of the scene behind the vehicle;

combining the first and second images to create a third image containing the second image and only the rear-facing, non-top-down view of the trailer from the first image with the trailer appearing as a ghost image in the third image; and responsive to an excessive angular offset between the first longitudinal axis and the second longitudinal axis, correcting for the angular offset in the third image using at least one of the first lateral image and the second lateral image.

10. A processor for a vehicle, the processor configured to:

receive first image data from a first camera wherein the first camera is configured to be mounted at the rear of the vehicle in a rear-facing orientation, wherein the first image data corresponds to a first image that includes a rear-facing, non-top-down view of a scene behind the vehicle in which a trailer that is being towed by the vehicle obstructs a portion of the scene, and wherein the first camera has a first field of view having a line of sight substantially coincident with a first longitudinal axis;

receive second image data from a second camera, wherein the second camera is configured to be mounted in a rear-facing orientation to the trailer that is being towed by the vehicle, wherein the second image data corresponds to a second image that includes a rear-facing, non-top-down view of the scene behind the vehicle in which the portion of the scene obstructed by the trailer in the first image is not obstructed by the trailer, and wherein the second camera has a second field of view having a line of sight substantially coincident with a second longitudinal axis;

receive first lateral image data from a third camera, wherein the third camera is configured to be mounted at a first side of the vehicle, and wherein the first lateral image data corresponds to a first lateral image that includes a rear-facing, non-top-down view of the scene behind the vehicle;

receive second lateral image data from a fourth camera, wherein the fourth camera is configured to be mounted at a second side of the vehicle, and wherein the second lateral image data corresponds to a second lateral image that includes a rear-facing, non-top-down view of the scene behind the vehicle;

generate a composite image from the first and second image data to create a third image containing the second image and only the rear-facing, non-top-down view of the trailer from the first image with the trailer appearing as a ghost image in the third image; and responsive to an excessive angular offset between the first longitudinal axis and the second longitudinal axis, correct for the angular offset in the third image using at least one of the first lateral image data and the second lateral image data.

11. A vehicle having the display system of claim 1.

* * * * *